United States Patent
Bini et al.

(10) Patent No.: US 7,676,247 B2
(45) Date of Patent: Mar. 9, 2010

(54) BASEBAND PROCESSOR AND A METHOD OF TRANSMITTING COMMANDS TO A RADIO-FREQUENCY SUBSYSTEM AND RADIO TELECOMMUNICATION APPARATUS INCORPORATING THE BASEBAND PROCESSOR

(75) Inventors: Jean-Claude Bini, Vence (FR); François Chancel, Cannes (FR)

(73) Assignee: ST-Ericsson SA, Geneva (CH)

( * ) Notice: Subject to any disclaimer, the term of this patent is extended or adjusted under 35 U.S.C. 154(b) by 145 days.

(21) Appl. No.: 10/591,544

(22) PCT Filed: Feb. 21, 2005

(86) PCT No.: PCT/IB2005/000513

§ 371 (c)(1), (2), (4) Date: Sep. 1, 2006

(87) PCT Pub. No.: WO2005/093969

PCT Pub. Date: Oct. 6, 2005

(65) Prior Publication Data

US 2007/0165560 A1      Jul. 19, 2007

(30) Foreign Application Priority Data

Mar. 4, 2004     (EP)     .................................. 04300116

(51) Int. Cl.
H04Q 7/20      (2006.01)
H04B 1/38      (2006.01)

(52) U.S. Cl. .................. 455/557; 455/77; 455/450; 455/550.1

(58) Field of Classification Search ................ 455/574, 455/550.1, 425; 370/379
See application file for complete search history.

(56) References Cited

U.S. PATENT DOCUMENTS

| | | | |
|---|---|---|---|
| 6,748,451 B2* | 6/2004 | Woods et al. | 709/248 |
| 7,149,213 B1* | 12/2006 | Rosner et al. | 370/379 |
| 7,570,973 B1* | 8/2009 | Bienek et al. | 455/557 |
| 2001/0024433 A1* | 9/2001 | Vanttinen | 370/338 |
| 2002/0065045 A1* | 5/2002 | Kim | 455/41 |
| 2003/0181211 A1* | 9/2003 | Razavilar et al. | 455/450 |

* cited by examiner

Primary Examiner—Rafael Pérez-Gutiérrez
Assistant Examiner—Frank Donado
(74) Attorney, Agent, or Firm—William J. Kubida; Peter J. Meza; Hogan & Hartson LLP

(57) ABSTRACT

The baseband processor (18) comprises: a storage unit (72) storing: a descriptor table comprising for each descriptor: a pointer field designed to point to a definition of an operation, an absolute operation time field indicating at which time from the beginning of a frame processing the corresponding operation should be carried out, an operation definition table comprising for each operation a definition of the operation, each definition having a sequence of events, each event of the definition table being associated with a relative event time field indicating at which time from the beginning of the operation the corresponding event should be executed, and a calculator (70) to automatically compute a list of events from the description and operation tables.

17 Claims, 3 Drawing Sheets

BASEBAND PROCESSOR AND A METHOD OF TRANSMITTING COMMANDS TO A RADIO-FREQUENCY SUBSYSTEM AND RADIO TELECOMMUNICATION APPARATUS INCORPORATING THE BASEBAND PROCESSOR

FIELD OF THE INVENTION

The present invention relates to a baseband processor and a method of transmitting commands to a radio-frequency subsystem, and a radio telecommunication apparatus incorporating the baseband processor.

BACKGROUND OF THE INVENTION

More precisely, the invention relates to a baseband processor comprising:
  a memory to store a list of events wherein each event of said list is associated with an absolute event time field indicating at which time from the beginning of the frame processing the event should be executed,
  an interface with the radio-frequency subsystem, designed to execute each event of said list of events in order to transmit to the radio-frequency subsystem the corresponding command, each event being executed during the frame processing at a time corresponding to the value of the associated absolute event time field, and
  a calculator to compute and store said list of events in the memory.

Baseband processors and radio-frequency subsystems are used, for example, in GSM (Global System for Mobile communications), GPRS (General Packet Radio Service) and EGPRS (Enhanced General Packet Radio Service) telecommunication apparatus such as cellular mobile phones to receive or transmit radio signals which are organized into frames. The structure of each frame is normalized.

In conventional mobile phones, during reception of radio signals, the radio-frequency subsystem receives radio signals, converts the radio signals into baseband signals and sends the baseband signals to the baseband processor. Thereafter the baseband processor processes the received baseband signals and controls the man/machine interfaces of the mobile phone according to the received basebands signals.

During transmission of radio signals, the baseband processor generates a baseband signal and sends it to the radio-frequency subsystem. The radio-frequency subsystem receives the generated baseband signal and converts it into a radio signal, which is sent over the air.

In order to correctly process a frame, the tuning or setting of the radio-frequency subsystem must be changed several times during the processing of one frame. For example, a frequency channel or a receiver gain of the radio-frequency subsystem must be changed while one frame id being processed. To do so, the baseband processor transmits commands to the radio-frequency subsystem at a predetermined time during the frame processing. Up to one hundred commands must be transmitted to the radio-frequency subsystem during the processing of one frame.

The time to send a command must be controlled with a time resolution as small as a one quarter-bit period. For GSM apparatuses, a one quarter-bit period is, for example, equal to 923 ns.

In order to achieve such a fine time resolution, the calculator of the baseband processor computes the list of events before the beginning of the frame processing.

During the frame processing, the interface executes this list of events so the behaviour of the interface is accurately controlled.

During each frame processing, it may be necessary to set the radio-frequency subsystem in a receiving mode, then in a transmitting mode and then back to the receiving mode. To set the radio-frequency subsystem in the receiving mode, a sequence or a succession of commands must be transmitted by the interface to the radio-frequency subsystem. The sequence of commands corresponds to a sequence of events in the list of events. Hereinafter, such a sequence of events, which corresponds to a particular change in the setting of the radio-frequency subsystem is called an operation.

Therefore, if during the processing of one frame, the radio-frequency subsystem must be switched to receiving mode two times, the list of events includes two times the same sequence of events.

To compute the list of events, a storage unit associated with the calculator stores a predefined list of events. Before each frame processing, this predetermined list of events is processed in order to cancel any unnecessary events for the next frame processing.

Because oftentimes, during the processing of one frame the same operation must be repeated two or more times, the predetermined list of events must be repeated two or more times. This repetition of operations results in an ineffective use of the storage unit space.

SUMMARY OF THE INVENTION

It is accordingly an object of the invention to provide a bandbase processor which requires smaller storage unit space.

With the following and other object in view there is provided in accordance with the invention a baseband processor wherein the baseband processor further comprises:
  a storage unit storing:
    a descriptor table comprising for each descriptor:
      a pointer field to point to a definition of an operation to be carried out by said interface during the frame processing,
      an absolute operation time field indicating at which time from the beginning of the frame processing the corresponding operation should be carried out by said interface,
    an operation definition table comprising for each operation a definition of the operation, each definition having a sequence of events to be executed by the interface in order to carry out said operation, each event of the definition table being associated with a relative event time field indicating at which time from the beginning of the operation the corresponding event should be executed, and
  wherein said calculator is designed to automatically compute said list of events from the description and operation tables.

With this baseband processor, if an operation A must be repeated two times during the processing of one frame, the storage unit only comprises a first and a second descriptor coding respectively for the first and second occurrences of operations A. The first and second descriptors comprise a pointer field pointing to the same definition of operation A in the operation definition table. Therefore, the sequence of events corresponding to operation A is stored only once even if this operation has to be executed several times during the frame processing. As a result, a data structure made of the descriptor table and the definition table save storage unit space.

The features, so that:
the storage unit further comprises a data table having parameter values,
at least one definition of the operation definition table has an event associated with an unknown parameter value,
each descriptor which comprises a pointer field pointing to an operation definition, definition of which comprises an event associated with an unknown parameter value is associated with a parameter value of the data table, and
the calculator replaces the unknown parameter value in a definition with the parameter value associated with the descriptor comprising a pointer field pointing to this definition, in order to compute said list of events, have the advantage to further save storage unit space since operations which only differ by the value of one or more parameters are recorded only once in the operation definition table.

The features, so that:
the memory comprises a non-dedicated random access memory which is connected to the calculator and to the interface through a shared memory access bus,
the calculator stores the list of events in said memory using the shared memory access bus, and
the interface reads the list of events in said memory using the shared memory access bus,
the interface reads the list of events using direct memory access technologies (DMA), allow reallocation of the memory space of the random access memory not used by the interface, to other applications carried out by the calculator. Such a possibility does not exist when the list of events is stored in a memory dedicated to the interface of the baseband processor.

The features, so that the calculator comprises:
a main processor programmed to update the description table in the storage unit in order to tune the radio-frequency subsystem for the processing of the next frame, and
a coprocessor associated with the main processor, the coprocessor being able to compute said list of events form the stored tables in the storage unit, have the advantage to reduce the work load of the main processor. Indeed, the number of descriptors is far inferior to the number of events in the events list. Therefore, since the main processor processes less data, the work load of this processor is decreased.

Other features of the claimed baseband processor are further recited in the dependent claims.

The invention also relates to a method carried out by the above baseband processor and a storage unit used to realise the baseband processor.

The invention also relates to a radio telecommunication apparatus incorporating the claimed baseband processor.

DESCRIPTION OF THE PREFERRED EMBODIMENTS

Figure 1:
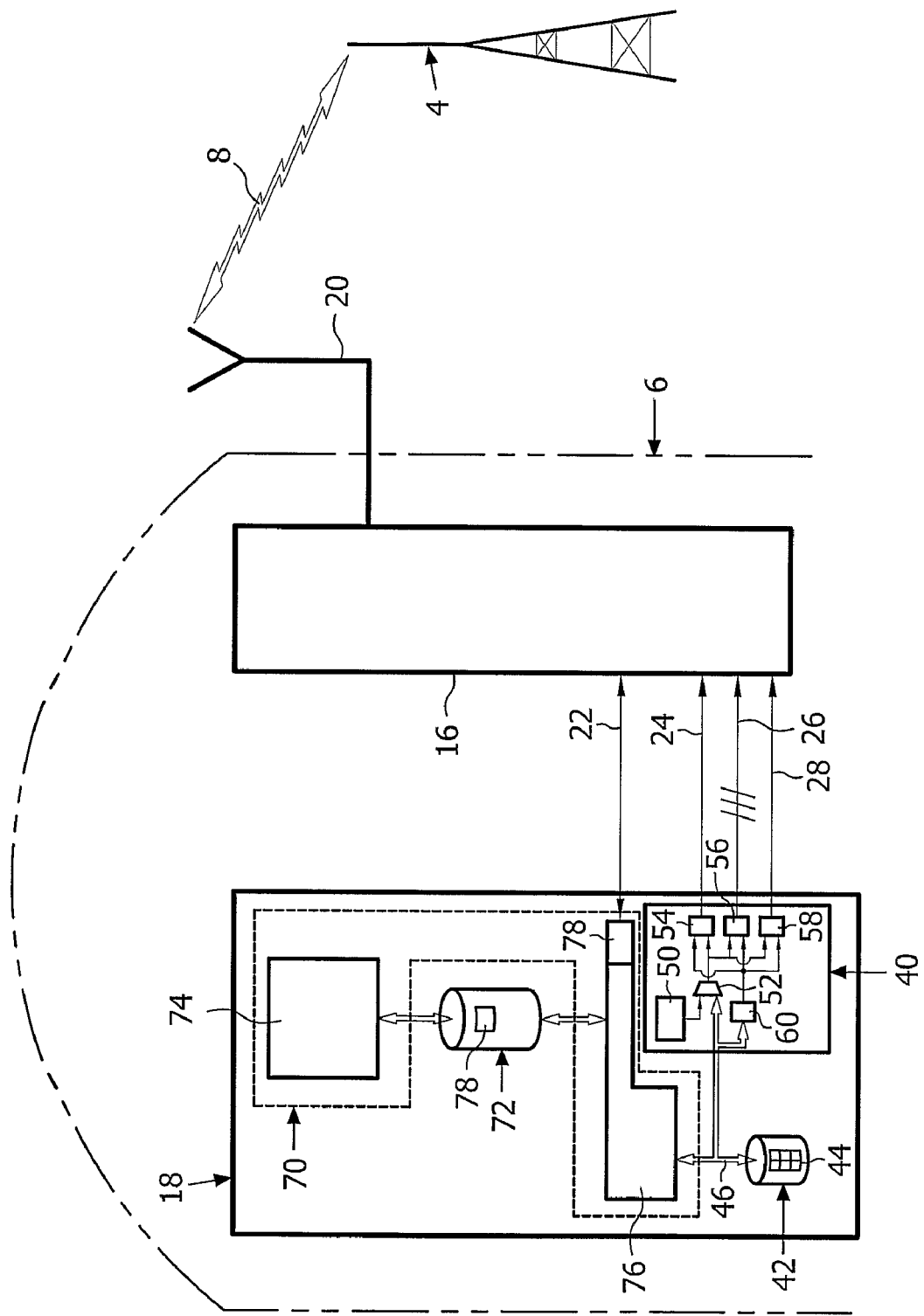
FIG. 1 is a schematic diagram of a radio telecommunication apparatus incorporating a baseband processor according to the invention.

FIG. 1 shows a part of a radio telecommunication apparatus 6. By way of illustration, this radio telecommunication apparatus is a GSM radio cellular mobile phone 6. Phone 6 is able to communicate with a base station 4 of a radio cellular phone network using radio signals 8. To do so, phone 6 implements a TDMA (Time Division Multiple Access) technique.

Figure 2:
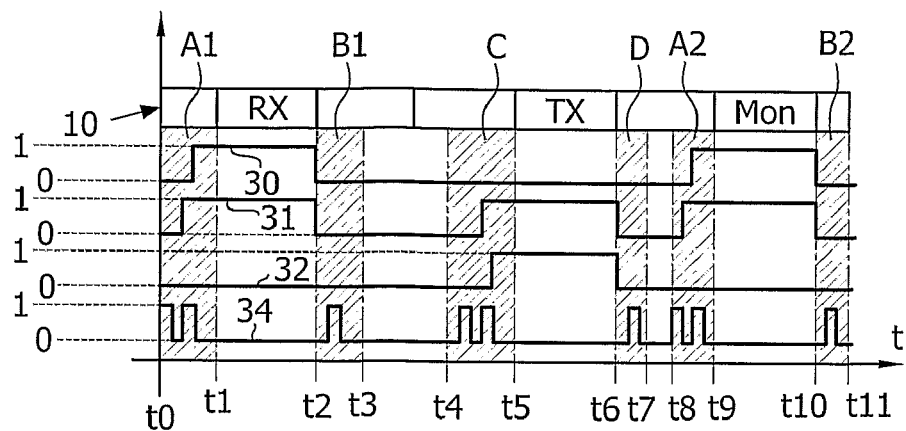
FIG. 2 is a graph illustrating commands to process a GSM frame.

Base station 4 is equipped with an emitter and a receiver to transmit and receive radio signals 8 from phone 6. Radio signals 8 are organized in frames of 1250 bits of information. FIG. 2 illustrates such a frame 10. Frame 10 comprises an RX slot, a "Mon" slot, and a TX slot. During the RX and "Mon" slots, information is received by phone 6. During TX slot information is transmitted to base station 4 by phone 6. More precisely, the RX slot represents the reception of a normal burst and the "Mon" slot represents the power monitoring of an adjacent cell.

To receive or transmit such radio signals, phone 6 comprises a conventional tunable radio-frequency subsystem 16 and a baseband processor 18. Subsystem 16 is connected to an antenna 20 to receive or transmit radio signals.

Subsystem 16 is able to convert a received radio signal into a baseband signal and vice-versa. In other words, the main task of subsystem 16 is to remove a carrier from the radio signal or to add such a carrier to a baseband signal. Baseband signals are exchanged between processor 18 and subsystem 16 through lines 22 . . . connecting subsystem 16 to processor 18.

For setting or tuning subsystem 16, processor 18 is connected to subsystem 16 through a three-wire bus 24, digital output lines 26 and one or more analog lines 28.

The three-wire bus 24 is used to transmit control messages called "telegrams". For example, such telegraphs are used to change a frequency channel of subsystem 16.

Lines 26 are two state lines which can be set either in a logic one or logic zero state. For example, lines 26 are used to control an antenna front end switch in subsystem 16 to shift from a receiving mode to a transmitting mode and vice-versa.

Lines 28 are used to send analog signals. Such analog signals are, for example, used to control a reference frequency of subsystem 16 and to control a transmission power level.

Lines 30 to 32 of FIG. 2 represent the time variations of lines 26 during the processing of frame 10.

A line 34 of FIG. 2 represents the time at which telegraphs are sent on bus 24 to process frame 10. Transmission of a telegraph is illustrated by a logic one state while an idle state is illustrated by a logic zero state.

The sequence of commands sent between time $t_0$ and $t_1$ on FIG. 2 is used to shift subsystem 16 in the receiving mode immediately before the beginning of the RX slot of frame 10. The sequence of commands corresponds to an operation A1.

Similarly, on FIG. 2, five other operations B1, C, D, A2 and B2 are represented, corresponding to sequences of commands sent between time $t_2$ and $t_3$, $t_4$ and $t_5$, $t_6$ and $t_7$, $t_8$ and $t_9$, and $t_{10}$ and $t_{11}$, respectively. Here, operations B1 and B2 shift the subsystem out of the receiving mode. Operation C shifts subsystem 16 into the transmitting mode. Operation D shifts subsystem 16 out of the transmitting mode. Operation A2 shifts subsystem 16 once again into the receiving mode. Operations A2 and B2 are similar or identical to operations A1 and B1, respectively.

To transmit each command at the right time to subsystem 16, the processor 18 comprises a hardwired radio-frequency control interface 40 and a random access memory 42.

Memory 42 is designed to contain a list of events 44. In this list, each event is associated with an absolute event time field and an event type field. The absolute event time field indicates at which time the associated event is to be executed during a frame processing. The event type field indicates which one among bus 24, lines 26 and lines 28 is concerned with the associated event. For example, list 44 is a three-column table where the first column contains the events to be executed, the second column contains the associated event time field, and the third column the event type field.

The time in the absolute event time field is counted from the beginning of the frame to be processed. For a GSM frame, this absolute event time field contains an integer number ranging from one to five thousand. This integer number corresponds to the quarter-bit period number of a GSM frame. Therefore, number 1 corresponds to the first quarter-bit period of the GSM frame, whereas number 5000 corresponds to the last quarter-bit period of the GSM frame.

Memory 42 is connected to interface 40 through a memory access bus 46.

The interface 40 is able to execute every event of list 44 at the corresponding absolute event time. To do so, interface 40 comprises a GSM timer 50, which counts the number of quarter-bit periods elapsed since the beginning of the GSM frame processing. This timer 50 is connected at a first input of a comparator 52. A second input of the comparator 52 is designed to receive the numbers stored in the absolute event time fields of list 44. To read data in memory 42, interface 40 uses a conventional DMA (Direct Memory Access) technology. An output of the comparator 52 is connected to an enable input of three blocks 54, 56 and 58.

Block 54 is designed to send a telegram on bus 24.
Block 56 is designed to change the state of lines 26.
Block 58 controls the analog lines 28.
Interface 40 also comprises a hardwired controller 60, which controls blocks 52, 56 and 58 in accordance with the events of list 44.

To compute list 44 and store it in memory 42, processor 18 comprises a calculator 70 and a storage unit 72.

For faster performance, the calculator 70 comprises a main processor 74 and a coprocessor 76. Main processor 74 is a conventional programmable micro-controller. The coprocessor 76 can be, for example, a DSP (Digital Signal Processor) chip.

Figure 3:
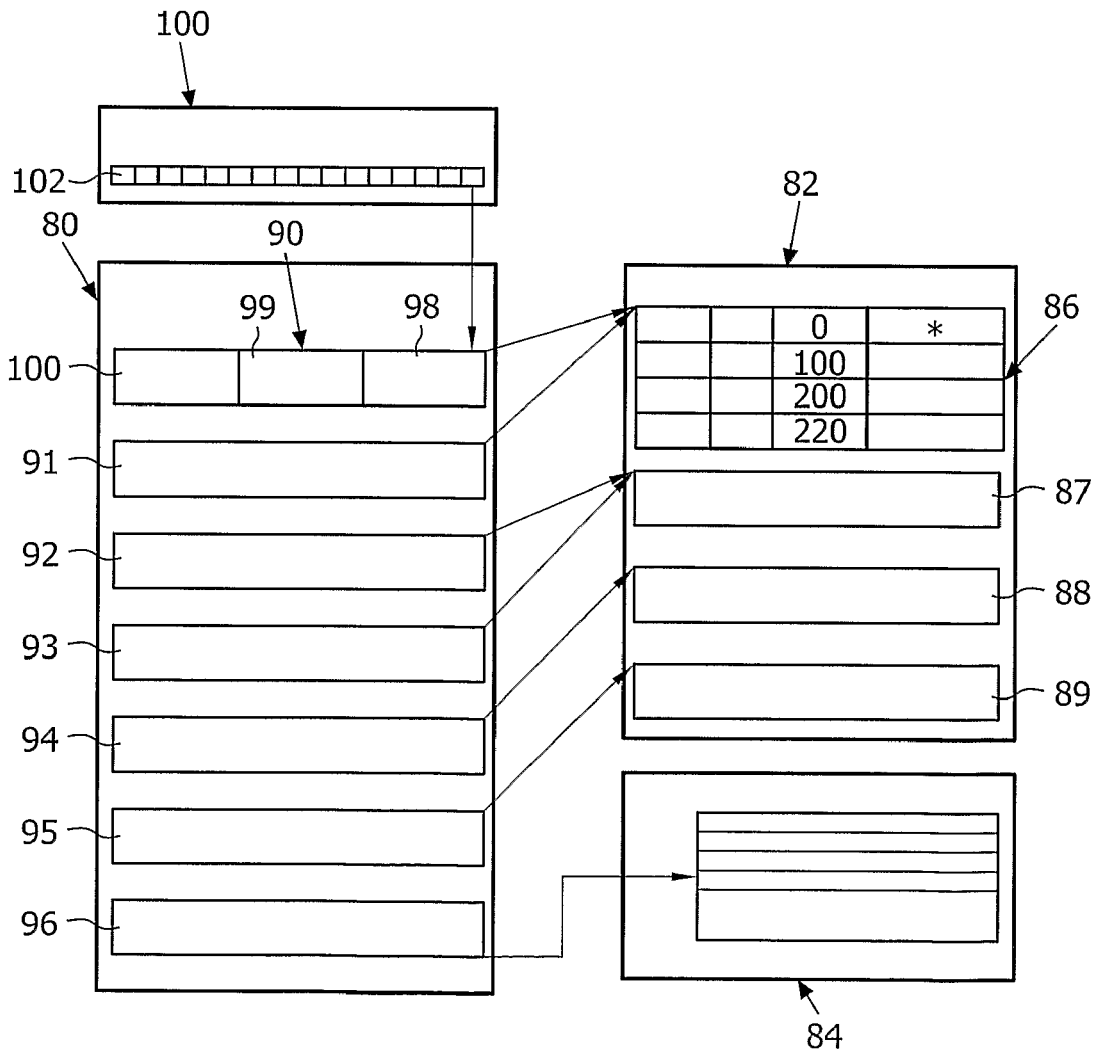
FIG. 3 is a schematic diagram of a data structure used in the baseband processor according to the invention.

Micro-controller 74 is programmed to execute the method described in FIG. 3. However, microcontroller 74 is typically, also programmed to control every user interface of phone 6 such as a monitor, keyboard, speaker and other elements.

The coprocessor 76 is especially designed to process the baseband signal received or transmitted through line 22. In order to do so, it comprises analog-to-digital converters 78, which converts the analog baseband signal received through line 22 into a digital signal, and vice-versa.

More specifically, the coprocessor 76 is also designed to build list 44 and to store it in memory 42. To do so, the coprocessor 76 is connected to the memory 42 through bus 46. Bus 46 to access memory 42 is a shared resource between interface 40 and coprocessor 76. Since memory 42 can be accessed by different electronic applications of phone 6 through a common bus 46, such a memory 42 is an undedicated memory.

Storage unit 72 is a dual port random access memory (DPRAM) or allowing data exchange between microcontroller 74 and coprocessor 76. The first port of storage unit 72 is connected to microcontroller 74 and the second port of storage unit 72 is connected to coprocessor 76.

To save space in storage unit 72, a special data structure 78 is used.

Data structure 78 is illustrated in more detail on FIG. 3. It comprises a descriptor table 80, an operation definition table 82 and a data table 84.

Table 82 comprises one operation definition for each similar operation. Here, four definitions 86 to 89 are represented. Definitions 86 through 89 correspond to the definitions of operations A1 and A2, B1 and B2, C, and D, respectively.

The definitions of each operation have a similar structure. Therefore, only the structure of definition 86 will be described.

As an example, in FIG. 3, definition 86 has a four-column table structure. The four-column table structure comprises one row per event of the sequence of events forming operation A1 or A2.

The cells of the first column are event fields. Each event field comprises an event to be executed by interface 40. The cells of the second column are event type fields comprising an identifier of one of blocks 54, 56 and 58. This identifier determines which block among blocks 52, 56 and 58 executes the event of the first column.

The cells of the third column are relative event time fields. Each relative event time field contains the time at which the associated event of the first column is to be executed. The relative event time is counted from the beginning of the operation rather than from the beginning of the frame. This relative event time is, for example, recorded as an integer number of quarter-bit-periods elapsed since the beginning of the operation. So a value of "200" in the relative event time field of the third row indicates that the third event of definition 86 is to be executed 200 quarter-bit periods after the beginning of the operation.

The cells of the last column are parameter fields, which contain either a numerical value or an unknown value indicated, for example, by symbol "*".

Advantageously, table 82 is a pre-recorded table.

Descriptor table 80 contains at least one descriptor per operation to be executed during one frame processing. Here, table 80 comprises a number of descriptors equal to the maximum number of operations to be executed during one frame processing. This maximum number is, for example, equal to 16 in the case of GSM frames.

In FIG. 3, only the seven first descriptors 90 through 96 are represented. Descriptors 90 through 95 correspond to operations A1, A2, B1, B2, C and D respectively. Descriptor 96 is an unnecessary descriptor for the processing of frame 10.

Each descriptor comprises at least three fields:
- a pointer field 98 pointing to the first row of the corresponding operation definition in table 82,
- a consecutive event number field 99 indicating the number of the row in the associated definition, and
- an absolute operation time field 100 indicating at which time within the frame the corresponding operation should be executed. The absolute operation time is counted from the beginning of the frame processing. This absolute operation time is, for example, recorded as an integer number of quarter-bit periods elapsed since the beginning of the frame processing.

As an example, the pointer field of descriptor 90 comprises the address of the first row of definition 86, the consecutive event number field 99 is equal to 4 and the absolute time field is equal to 0.

In FIG. 3, the arrows indicate the definition to which each descriptor is currently pointing.

Table 84 contains the parameter values that should be used instead of the symbol "*" which is present in the definition of an operation. By way of illustration only, table 84 is a one-column table, which comprises one row for each descriptor of table 80. More precisely, the first row is associated with the first descriptor of table 80, the second row is associated with the second descriptor of table 18, and so on.

Finally, data structure 78 also comprises an enable table 100. Table 100 only comprises, for example one row, which contains one cell 102 per descriptor. The first cell is associated with the first descriptor, the second cell is associated with the second descriptor and so on. Each cell contains a Boolean value "True" or "False".

When the value of one cell 102 is set to "true", that means that the associated descriptor is to be used to compute list 44.

On the other hand, if the value of one cell 102 is set to "False", the associated descriptor must not be used to compute list 44.

Figure 4:
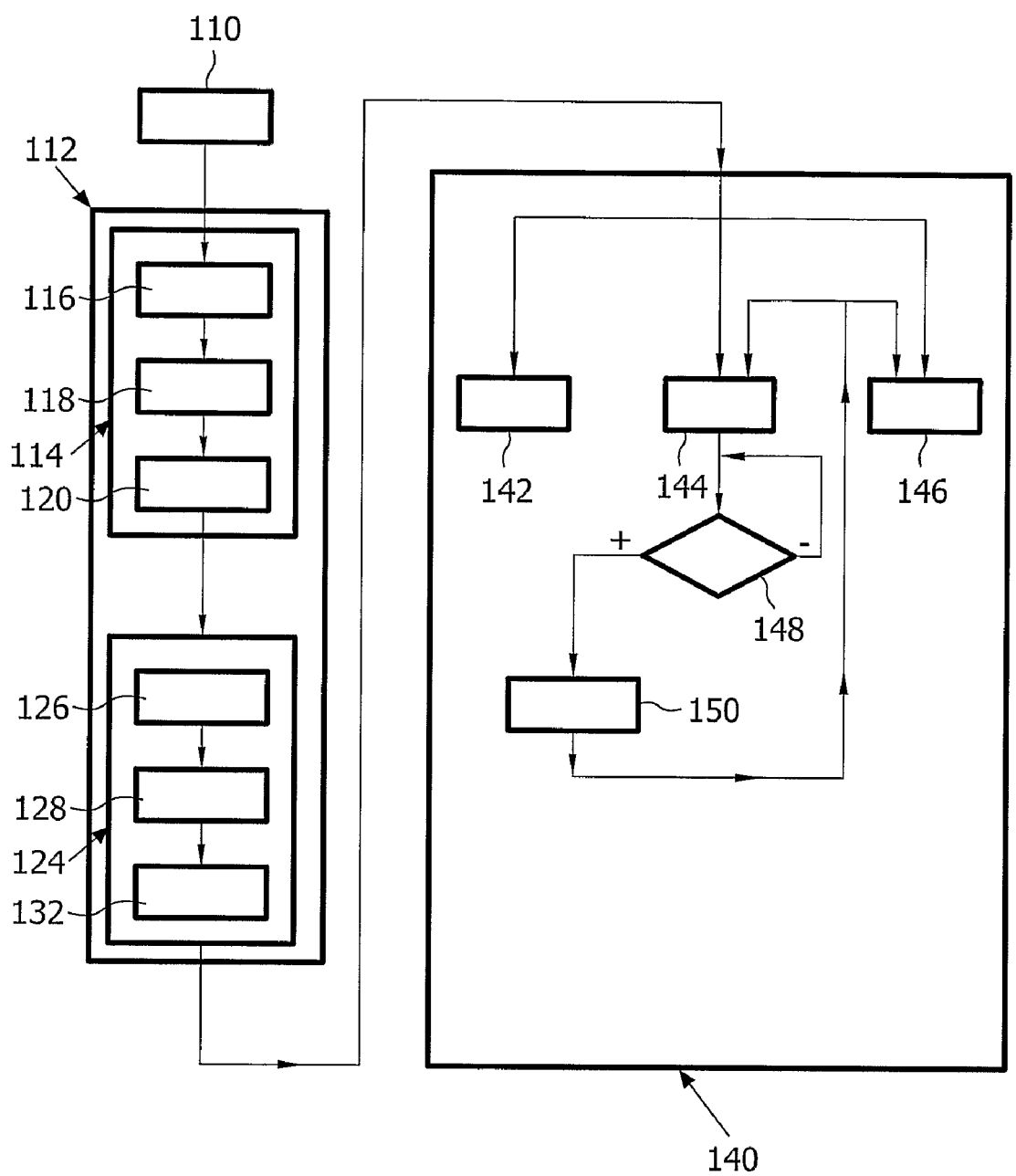
FIG. 4 is a flow chart of a method for transmitting commands to a tunable radio-frequency subsystem according to the invention.

The way in which processor 18 works will now be explained with reference to FIG. 4 in the particular case of the processing of frame 10.

At initialization, for example, during the manufacturing process of phone 6, table 82 is recorded, in step 110, in storage unit 72. Then table 82 remains constant and unamended during every frame processing.

Before starting to process frame 10, calculator 70 computes a new list 44 in step 112.

At the beginning of step 112, microcontroller 74 updates, in a sub-step 114, the values contained in tables 80, 84 and 100. The values to be updated to process frame 10 are determined in a conventional way in accordance with the structure of frame 10.

In particular, during an operation 116, microcontroller 74 sets to "True" the value of cells 102 associated with descriptors 90 to 95. The cells 102 associated with a descriptor, like descriptor 96, which is not needed for the processing of frame 10 are set to "False".

Then, microcontroller 74 amends, if necessary, during an operation 118, the value stored in the absolute operation time field 100 of descriptors 90 to 95. Here microcontroller 74 stores in the absolute operation time fields 100 of descriptors 90 through 95, the respective values corresponding to time $t_0$, $t_8$, $t_2$, $t_{10}$, $t_4$, $t_6$ (FIG. 3).

Micro-controller 74 also amends, if necessary, during an operation 120, the parameter values stored in table 84.

Once every value necessary to process frame 10 has been recorded in tables 80, 84 and 100, microcontroller 74 activates coprocessor 76.

Once activated, coprocessor 76 computes, in sub-step 124, list 44 from the data recorded in data structure 78.

To do so, coprocessor 76 builds, during an operation 126, a sorted list of descriptors. This list comprises the descriptors of table 80 which are associated with a cell 102 containing the "True" value. This list is sorted according to the value of the absolute operation time field from the first operation to be executed to the last one.

Then, in the sorted list of descriptors, coprocessor 76 replaces, during an operation 128, each descriptor with the corresponding definition pointed to by the pointer field 98. During operation 128, coprocessor 76 replaces the symbol "*" appearing on the first row of definition 86 with the corresponding parameter value read from the first row of table 84.

During operation 128, coprocessor 76 also calculates the absolute event time of each event by adding the values stored in the absolute operation time field 100 and in the relative event time field.

Therefore, at the end of operation 128, coprocessor 76 has built a list of events sorted by absolute event time.

During an operation 132, this list is then stored in memory 42, as new list 44. To execute operation 132, coprocessor 76 uses bus 46. Step 112 ends, and interface 40 starts to process frame 10 in step 140.

During an operation 142, in step 140, timer 50 counts the number of quarter-bit periods elapsed since the beginning of the processing of frame 10. This number is transmitted to the first input of comparator 52.

In parallel, during an operation 144, interface 40 reads the value contained in the absolute event time field associated with the first event of list 44.

Still in parallel, during an operation 146, controller 60 reads the identifier contained in the event type field of the first event of list 44 and selects which block from blocks 54, 56, 58 will be used to execute the corresponding event.

During an operation 148, comparator 52 compares the values on its first and second inputs. When these values match, during an operation 150, the block selected by controller 60 executes the corresponding event and then returns to operations 144 and 146 in order to read and execute the next event in list 44.

In operation 150, the selected block transmits to subsystem 16 a command corresponding to the executed event.

On reception of the transmitted command, the setting of subsystem 16 is changed.

Steps 112 and 140 are executed for the processing of each frame.

Due to the use of data structure 78, the definition of an operation is stored only once, even if this definition is used at different times during the processing of one frame.

Further, due to the use of data structure 78, only one definition is stored for operations, which differ by a single parameter value.

Therefore, data structure 78 saves storage unit space.

Data structure 78 also decreases the work load of the microcontroller 74. In fact, if the new list 44 to build differs from the previous one, only by the fact that one operation is delayed, microprocessor 74 has only to modify the absolute time field of the corresponding descriptor. In contrast, in conventional processors, to perform such a task, the microprocessor has to update the event time field of each event of the sequence of events corresponding to this operation.

Processor 18 has been described in the particular case where memory 42 is a non-dedicated random access memory. Since memory 42 is a non-dedicated memory, it means that the memory space non-utilized to store list 44 can be used for other applications executed by calculator 70. This also saves memory space since free memory space in memory 42 can be used for other processes of applications.

In another embodiment, memory 42 is replaced by a bank of registers wherein each register is intended to receive only one event and its associated event time and event type fields. In such an embodiment, the bank of registers is connected to interface 40 by a reading bus and to the calculator 70 by an independent writing bus. Thus registers, which are not used to store list 44, cannot be used for other applications by calculator 70.

In the present embodiment, memory 42 and storage unit 72 have been described as independent and separate memories. However, in another embodiment, memory 42 and storage unit 72 can be different parts of a common information storage means.

Phone 6 has been described in the particular case where subsystem 16 is controlled through the use of bus 24 and lines 26 and 28. However, depending on the radio-frequency subsystem implemented in telephone 6, one of these buses or lines may not be used and can be suppressed. For example, if the radio-frequency subsystem implemented in telephone 6 only needs to be controlled through a three-wire bus, the architecture of telephone 6 is simplified. Indeed, lines 26 and 28 are suppressed as well as blocks 56, 58, and controller 60 and the event type fields of table 82 are no longer necessary.

Using coprocessor 76 to compute list 44 increases the speed of processing because such a coprocessor is optimized for this processing. However, in another embodiment, the whole step 112 is carried out by the micro-controller 74. On the other hand, to further increase speed processing, in another embodiment, the whole step 112 is implemented in a specific hardwired circuit.

Processor 18 and phone 6 have been described in the special case of GSM frame processing. However, the invention also applies to GPRS or EGPRS frames or any radiophones where it is necessary to tune a radio-frequency subsystem with a very fine time resolution.

The invention is claimed:

1. A radio telecommunication apparatus comprising a mobile phone incorporating a baseband processor for transmitting commands to a tunable radio-frequency subsystem, the radio-frequency subsystem for converting radio signals into baseband signals and vice-versa, for tuning the radio-frequency subsystem in synchronism with the processing of one signal frame, said baseband processor comprising:
- a memory to store a list of events wherein each event of said list is associated with an absolute event time field indicating at which time from the beginning of the frame processing the event should be executed;
- an interface with the radio-frequency subsystem, designed to execute each event of said list of events in order to transmit to the radio-frequency subsystem the corresponding command, each event being executed during the frame processing at a time corresponding to the value of the associated absolute event time field, and a calculator to compute and store said list of events in the memory;
- a storage unit comprising a descriptor table, wherein each descriptor of the descriptor table, comprises:
  - a pointer field to point to a definition of an operation to be carried out by said interface during the frame processing;
  - an absolute operation time field indicating at which time from the beginning of the frame processing the corresponding operation should be carried out by said interface; and
  - an operation definition table comprising for each operation a definition of the operation,
  wherein each definition has a sequence of events to be executed by the interface in order to carry out said operation,
  wherein each event of the definition table is associated with a relative event time field indicating at which time from the beginning of the operation the corresponding event should be executed, and
  wherein said calculator is designed to automatically compute said list of events from the description and operation tables, and
  wherein said baseband processor tunes the tunable radio-frequency subsystem by performing a particular independent operation more than once from a same definition in the operation definition table pointed to by the pointer during the processing of, and in synchronism with, said one signal data frame.

2. The device according to claim 1, wherein the storage unit further comprises:
a data table having parameter values, at least one definition of the operation definition table has an event associated with an unknown parameter value, each descriptor which comprises a pointer field pointing to an operation definition, definition of which comprises an event associated with an unknown parameter value is associated with a parameter value of the data table, and the calculator replaces the unknown parameter value in a definition with the parameter value associated with the descriptor comprising a pointer field pointing to this definition, in order to compute said list of events.

3. The device according to claim 2, wherein the interface reads the list of events using direct memory access technologies.

4. The device according to claim 1, wherein: the memory comprises a non-dedicated random access memory which is connected to the calculator and to the interface through a shared memory access bus, the calculator stores the list of events in said memory using the shared memory access bus, and the interface reads the list of events in said memory using the shared memory access bus.

5. The device according to claim 1, wherein the calculator comprises: a main processor programmed to update the description table in the storage unit in order to tune the radio-frequency subsystem for the processing of the next frame, and a coprocessor with the main processor, the coprocessor being able to compute said list of events from the stored tables in the storage unit.

6. The device according to claim 1, wherein the frame being processed comprises a Global System for Mobile Communication (GSM) frame.

7. The device according to claim 1, wherein the frame being processed comprises an Enhanced General Packet Radio Service (EGPRS) frame.

8. The device according to claim 1, wherein the frame being processed comprises a General Packet Radio Service (GPRS) frame.

9. A baseband processor for transmitting commands to a tunable radio-frequency subsystem, the radio-frequency subsystem for converting radio signals into baseband signals and vice-versa, in order for tuning the radio-frequency subsystem in synchronism with the processing of one signal frame, said baseband processor comprising:
- a memory for storing a list of events wherein each event of said list is associated with an absolute event time field indicating at which time from the beginning of the frame processing the event should be executed;
- an interface with the radio-frequency subsystem, designed to execute each event of said list of events in order to transmit to the radio-frequency subsystem the corresponding command, each event being executed during the frame processing at a time corresponding to the value of the associated absolute event time field, and a calculator to compute and store said list of events in the memory;

a storage unit comprising a descriptor table, wherein each descriptor of the descriptor table comprises:
- a pointer field to point to a definition of an operation to be carried out by said interface during the frame processing;
- an absolute operation time field indicating at which time from the beginning of the frame processing the corresponding operation should be carried out by said interface;
- an operation definition table comprising for each operation a definition of the operation,
- wherein each definition has a sequence of events to be executed by the interface in order to carry out said operation,
- wherein each event of the definition table is associated with a relative event time field indicating at which time from the beginning of the operation the corresponding event should be executed, and
- wherein said calculator is designed to automatically compute said list of events from the description and operation tables; and wherein said baseband processor tunes the tunable radio-frequency subsystem by performing a particular independent operation more than once from a same definition in the operation definition table pointed to by the pointer during the processing of, and in synchronism with, said one signal data frame.

10. A storage unit intended to be used in a baseband processor according to claim 9, wherein the storage unit comprises:
- a descriptor table comprising for each descriptor: a pointer field to point to a definition of an operation to be carried out by said interface during the frame processing,
- an absolute operation time field indicating at which time from the beginning of the frame processing the corresponding operation should be carried out by said interface,
- an operation definition table comprising for each operation a definition of the operation, each definition having a sequence of events to be executed by the interface in order to carry out said operation, each event of the definition table being associated with a relative event time field indicating at which time from the beginning of the operation the corresponding event should be executed.

11. The device according to claim 9, wherein the frame being processed comprises a Global System for Mobile Communication (GSM) frame.

12. The device according to claim 9, wherein the frame being processed comprises an Enhanced General Packet Radio Service (EGPRS) frame.

13. The device according to claim 9, wherein the frame being processed comprises a General Packet Radio Service (GPRS) frame.

14. A method for transmitting commands to a tunable radio-frequency subsystem, the radio-frequency subsystem being designed to convert radio signals into baseband signals and vice-versa, in order to tune the radio-frequency subsystem in synchronism with the processing of a signal frame, the method comprising the steps of:
- recording in a memory a list of events wherein each event of said list is associated with an absolute event time field, the absolute event time field indicating at which time from the beginning of the frame processing the event should be executed;
- executing each event of said list of events in order to transmit corresponding commands to the radio-frequency subsystem, each event being executed, during the frame processing, at a time corresponding to the value of the associated absolute event time field;
- computing and storing said list of events in the memory, and wherein the method further comprises the steps of:
  - recording in a storage unit a descriptor table, wherein each descriptor of the descriptor table comprises:
    - a pointer field designed to point to a definition of an operation to be carried out by said interface during the frame processing;
    - an absolute operation time field indicating at which time from the beginning of the frame processing the corresponding operation should be carried out by said interface;
    - an operation definition table comprising for each operation a definition of the operation,
    - wherein each definition has a sequence of events to be executed by the interface in order to carry out said operation, each event of the definition table being associated with a relative event time field indicating at which time from the beginning of the operation the corresponding event should be executed; and
  - automatically computing said list of events from the descriptor and operation tables; and
  - the baseband processor tunes the tunable radio-frequency subsystem by performing a particular independent operation more than once from a same definition in the operation definition table pointed to by the pointer during the processing of, and in synchronism with, said one signal data frame.

15. The device according to claim 14, wherein the frame being processed comprises a Global System for Mobile Communication (GSM) frame.

16. The device according to claim 14, wherein the frame being processed comprises an Enhanced General Packet Radio Service (EGPRS) frame.

17. The device according to claim 7, wherein the frame being processed comprises a General Packet Radio Service (GPRS) frame.

* * * * *